(12) United States Patent
Kato et al.

(10) Patent No.: US 10,948,436 B2
(45) Date of Patent: Mar. 16, 2021

(54) WAVELENGTH DISPERSIVE X-RAY FLUORESCENCE SPECTROMETER

(71) Applicant: Rigaku Corporation, Tokyo (JP)

(72) Inventors: Shuichi Kato, Takatsuki (JP); Takashi Yamada, Takatsuki (JP); Yoshiyuki Kataoka, Takatsuki (JP)

(73) Assignee: Rigaku Corporation, Akishima (JP)

( * ) Notice: Subject to any disclaimer, the term of this patent is extended or adjusted under 35 U.S.C. 154(b) by 180 days.

(21) Appl. No.: 16/370,363

(22) Filed: Mar. 29, 2019

(65) Prior Publication Data

US 2019/0227008 A1 Jul. 25, 2019

Related U.S. Application Data

(63) Continuation of application No. PCT/JP2017/031494, filed on Aug. 31, 2017.

(30) Foreign Application Priority Data

Sep. 30, 2016 (JP) .............................. JP2016-194356

(51) Int. Cl.
  *G01N 23/223* (2006.01)
  *G01N 23/2209* (2018.01)

(52) U.S. Cl.
  CPC ....... *G01N 23/223* (2013.01); *G01N 23/2209* (2018.02); *G01N 2223/076* (2013.01);
  (Continued)

(58) Field of Classification Search
  None
  See application file for complete search history.

(56) References Cited

U.S. PATENT DOCUMENTS 3,914,606 A 10/1975 Hashimoto et al.
7,190,762 B2 * 3/2007 He ........................ G01N 23/207
378/70

(Continued)

FOREIGN PATENT DOCUMENTS

CN 1504744 A 6/2004
CN 105403583 A 3/2016
(Continued)

OTHER PUBLICATIONS

Extended European Search Report dated May 25, 2020, from the European Patent Office in Application No. 17855565.2.
(Continued)

*Primary Examiner* — Thomas R Artman
(74) *Attorney, Agent, or Firm* — Sughrue Mion, PLLC

(57) ABSTRACT

A wavelength dispersive X-ray fluorescence spectrometer includes a single one-dimensional detector (10) having detection elements (7) arranged linearly, and includes a detector position change mechanism (11) for setting a position of the one-dimensional detector (10) to either a parallel position at which an arrangement direction of the detection elements (7) is parallel to a spectral angle direction of a spectroscopic device (6) or an intersection position at which the arrangement direction intersects the spectral angle direction. At the parallel position, a receiving surface of the one-dimensional detector (10) is located at a focal point of focused secondary X-rays (42). At the intersection position, a receiving slit (9) is disposed at the focal point of the focused secondary X-rays (42), and the receiving surface is located at a traveling direction side of the focused secondary X-rays (42) farther from the spectroscopic device (6) than the receiving slit (9).

5 Claims, 7 Drawing Sheets

(52) U.S. Cl.
CPC ............... *G01N 2223/1016* (2013.01); *G01N 2223/315* (2013.01); *G01N 2223/32* (2013.01); *G01N 2223/5015* (2013.01)

(56) References Cited

U.S. PATENT DOCUMENTS

| | | | |
|---|---|---|---|
| 7,450,685 B2* | 11/2008 | Kataoka | G01N 23/223 378/45 |
| 8,283,631 B2 | 10/2012 | Vaez-Iravani et al. | |
| 8,675,816 B2* | 3/2014 | Turyansky | G01N 23/2076 378/85 |
| 9,739,730 B2 | 8/2017 | Hegeman et al. | |
| 9,791,392 B2 | 10/2017 | Yagi | |
| 10,591,425 B2* | 3/2020 | Sato | G01N 23/207 |
| 2006/0093090 A1* | 5/2006 | He | G01N 23/207 378/70 |
| 2006/0153332 A1 | 7/2006 | Kohno et al. | |
| 2007/0086567 A1 | 4/2007 | Kataoka et al. | |
| 2009/0278044 A1 | 11/2009 | Vaez-Iravani et al. | |
| 2016/0069827 A1 | 3/2016 | Yagi | |
| 2016/0258892 A1 | 9/2016 | Hegeman et al. | |
| 2018/0202948 A1* | 7/2018 | Sato | G01N 23/207 |
| 2019/0227008 A1* | 7/2019 | Kato | G01N 23/207 |

FOREIGN PATENT DOCUMENTS

| | | |
|---|---|---|
| EP | 3 064 933 A1 | 9/2016 |
| JP | 49-118493 A | 11/1974 |
| JP | 5-340897 A | 12/1993 |
| JP | 8-128975 A | 5/1996 |
| JP | 2011-520126 A | 7/2011 |
| JP | 2012-58147 A | 3/2012 |
| JP | 2012-159404 A | 8/2012 |
| WO | 2004-086018 A1 | 10/2004 |
| WO | 2015/056305 A1 | 4/2015 |

OTHER PUBLICATIONS

Notification of Reasons of Refusal for JP Application No. 2016-194356 dated Sep. 25, 2018.
Decision of Grant for JP Application No. 2016-194356 dated Dec. 4, 2018.
International Search Report for PCT/JP2017/031494 dated Nov. 14, 2017 [PCT/ISA/210].
Communication dated Dec. 3, 2020 by the China National Intellectual Property Administration in application No. 201780059601.1.

* cited by examiner

SPECTRAL ANGLE DIRECTION

SPECTRAL ANGLE DIRECTION

WAVELENGTH DISPERSIVE X-RAY FLUORESCENCE SPECTROMETER

CROSS REFERENCE TO THE RELATED APPLICATION

This application is a continuation application, under 35 U.S.C. § 111(a), of international application No. PCT/JP2017/031494, filed Aug. 31, 2017, which claims priority to Japanese patent application No. 2016-194356, filed Sep. 30, 2016, the entire disclosure of which is herein incorporated by reference as a part of this application.

BACKGROUND OF THE INVENTION

Field of the Invention

The present invention relates to a wavelength dispersive X-ray fluorescence spectrometer including a focusing optical system.

Description of Related Art

In X-ray fluorescence analysis, background of fluorescent X-rays generated from a sample irradiated with primary X-rays needs to be accurately corrected in order to precisely measure trace elements contained in the sample. Therefore, a wavelength dispersive X-ray fluorescence spectrometer having a focusing optical system, which: performs monochromating by using a single spectroscopic device; has a receiving slit disposed in front of a single detector and having a plurality of openings adjacent to each other; changes the opening through which secondary X-rays pass; and corrects background of fluorescent X-rays from a sample, is known (Patent Document 1). This focusing optical system is used as a fixed optical system, and is thus used for an X-ray fluorescence spectrometer specific to a single element or a simultaneous multi-elements analysis type X-ray fluorescence spectrometer in general.

In many cases, as shown in FIG. 12 that schematically illustrates a fluorescent X-ray spectrum PS and a background spectrum BS, in a peak area PA in which the spectrum PS of fluorescent X-rays occurs and in adjacent areas of peak BA, the background spectrum BS changes approximately linearly. In general, in a sequential X-ray fluorescence spectrometer, when a goniometer is moved to an adjacent area of peak to measure a background intensity, it is assumed that the background intensity can be measured with almost the same sensitivity between the peak area and the adjacent area of peak, and a net intensity is obtained by subtracting a background measured intensity from a peak measured intensity.

Meanwhile, as in the spectrometer disclosed in Patent Document 1, in a wavelength dispersive X-ray fluorescence spectrometer of a focusing optical system in which a spectroscopic device and a detector are fixed, a receiving slit which is disposed in front of a single detector and which has a plurality of openings adjacent to each other is provided, and an opening through which secondary X-rays pass is changed so as to correspond to an adjacent area of peak, to measure a background intensity. However, a sensitivity of background is lower than that in a peak area, and, thus, an intensity which is lower than a background intensity that actually occurs, is measured. Therefore, an accurate net intensity cannot be obtained merely by subtracting a background measured intensity in the adjacent area of peak from a peak measured intensity.

Therefore, a wavelength dispersive X-ray fluorescence spectrometer having a focusing optical system, which: has a plurality of spectroscopic devices and a unit for selecting an optical path of secondary X-rays incident on a single detector; switches a spectroscopic device to be used; measures a peak intensity and a background intensity with sensitivities that are assumed to be almost the same; and corrects background of fluorescent X-rays generated from a sample, is known. Furthermore, a spectrometer that has, instead of the optical path selection unit of the above spectrometer, a position sensitive detector as a detector, to simultaneously measure a peak intensity and a background intensity in a short time period, is also known (Patent Document 2).

In principal component analysis in X-ray fluorescence analysis, high measurement accuracy is needed, and thus it is necessary to measure an element to be measured, at a high counting rate. However, with a conventional detector (a proportional counter, a scintillation counter, etc.), the counting upper limit at which counting linearity is obtained is about 1000 to 4000 kcps. Therefore, an attenuator exchange mechanism is provided, and, for example, when a metal sample containing a principal component element of which an X-ray intensity exceeds the counting upper limit is analyzed, a fluorescent X-ray intensity is decreased to be equal to or less than the counting upper limit, by using an attenuator. Alternatively, a fixed attenuator which attenuates an intensity, for a sample having a maximum content, such that the intensity does not exceed the counting upper limit is provided in some cases. In such a case, even for a low-content sample, an intensity is attenuated. Instead of using the attenuator, a tube voltage or a tube current to be supplied to an X-ray tube is decreased, and measurement is performed in some cases (for example, paragraph 0002 of Patent Document 3).

RELATED DOCUMENT

Patent Document

[Patent Document 1] JP Laid-open Patent Publication No. H08-128975
[Patent Document 2] WO 2004/086018
[Patent Document 3] JP Laid-open Patent Publication No. 2012-159404

SUMMARY OF THE INVENTION

However, in the spectrometer disclosed in Patent Document 2, a plurality of spectroscopic devices are provided in order to separately measure fluorescent X-rays and the background thereof, and, therefore, a problem arises that the structure of the spectrometer is complicated, cost is high, and a time required for assembling or alignment of the spectrometer is increased.

In principal component analysis, to decrease a fluorescent X-ray intensity using an attenuator such that the fluorescent X-ray intensity is equal to or less than the counting upper limit, or to decrease a tube voltage or a tube current to be supplied to an X-ray tube and perform measurement, it is necessary to set appropriate analysis conditions for each sample, and thus the measurement operations become complicated. In addition, due to the decrease of the X-ray intensity, a problem also arises that the measurement accuracy deteriorates.

The present invention is made in view of the problems of the conventional art, and an object of the present invention is to provide a wavelength dispersive X-ray fluorescence spectrometer that can quickly perform, with a simple structure, both: high-precision quantitative analysis in which an accurate net intensity is obtained at a high speed; and high-precision principal component analysis at a high counting rate.

In order to attain the aforementioned object, the present invention is directed to a wavelength dispersive X-ray fluorescence spectrometer of a focusing optical system, the wavelength dispersive X-ray fluorescence spectrometer comprising: an X-ray source configured to irradiate a sample with primary X-rays; a divergence slit configured to allow secondary X-rays generated from the sample to pass therethrough; a spectroscopic device configured to monochromate and focus the secondary X-rays that have passed through the divergence slit; and a single one-dimensional detector having a plurality of detection elements arranged linearly and having a receiving surface perpendicular to an optical axis of focused secondary X-rays obtained by the secondary X-rays being focused by the spectroscopic device, wherein the wavelength dispersive X-ray fluorescence spectrometer comprises a detector position change mechanism for setting a position of the one-dimensional detector such that the position of the one-dimensional detector is freely changed to either a parallel position at which an arrangement direction of the detection elements coincides with a spectral angle direction of the spectroscopic device or an intersection position at which the arrangement direction of the detection elements intersects the spectral angle direction of the spectroscopic device.

In the present invention, in a state where the one-dimensional detector is set at the parallel position, the receiving surface of the one-dimensional detector is located at a focal point of the focused secondary X-rays; and in a state where the one-dimensional detector is set at the intersection position, a receiving slit having an opening having a longitudinal direction orthogonal to the spectral angle direction of the spectroscopic device is disposed at the focal point of the focused secondary X-rays, and the receiving surface of the one-dimensional detector is located at a traveling direction side of the focused secondary X-rays farther from the spectroscopic device than the receiving slit.

According to the present invention, since the detector position change mechanism for changing the position of the one-dimensional detector such that the position of the one-dimensional detector is freely changed to either the parallel position at which the arrangement direction of the detection elements coincides with the spectral angle direction of the spectroscopic device or the intersection position at which the arrangement direction of the detection elements intersects the spectral angle direction of the spectroscopic device, is included, both high-precision quantitative analysis in which an accurate net intensity is obtained at a high speed and high-precision principal component analysis at a high counting rate can be quickly performed with a simple structure.

In the present invention, the wavelength dispersive X-ray fluorescence spectrometer preferably includes: a detection area setting unit configured to allow for setting a peak area that is an area of the detection elements corresponding to fluorescent X-rays to be measured, and a plurality of background areas that are areas of the detection elements corresponding to background of the fluorescent X-rays to be measured, in the arrangement direction of the detection elements; and a quantification unit configured to calculate, as a net intensity, an intensity of the fluorescent X-rays to be measured, based on a peak intensity obtained by integrating detected intensities by the detection elements in the peak area, a background intensity obtained by integrating detected intensities by the detection elements in each background area, and a background correction coefficient which is previously input, and to perform quantitative analysis, in a state where the one-dimensional detector is set at the parallel position. In this case, background which is measured so as to indicate an intensity lower than a background intensity that actually occurs is accurately corrected, and the peak intensity and the background intensities are simultaneously measured. Thus, high-precision quantitative analysis in which an accurate net intensity is obtained at a high speed can be performed.

In the present invention, the wavelength dispersive X-ray fluorescence spectrometer preferably includes a quantification unit configured to calculate an intensity of fluorescent X-rays to be measured, by integrating detected intensities by all the detection elements, and to perform quantitative analysis, in a state where the one-dimensional detector is set at the intersection position. In this case, an intensity of fluorescent X-rays to be measured is calculated by integrating detected intensities by all the detection elements, whereby high-precision principal component analysis can be performed at a high counting rate.

In the present invention, the intersection position is preferably either one of an orthogonal position at which the arrangement direction of the detection elements is orthogonal to the spectral angle direction of the spectroscopic device or a single oblique intersection position at which the arrangement direction of the detection elements obliquely intersects the spectral angle direction of the spectroscopic device at a predetermined angle. In this case, the intersection position is either one of the orthogonal position or the single oblique intersection position, and the one-dimensional detector can be set at an optimum position for the relationship with a projection image of the focused secondary X-rays on the receiving surface. Thus, the intensity of the focused secondary X-rays can be detected at the maximum, and high-precision principal component analysis can be performed at a higher counting rate.

In the present invention, preferably, the receiving surface of the one-dimensional detector is rectangular, and the intersection position is a diagonal line position at which a diagonal line direction of the receiving surface of the one-dimensional detector is orthogonal to the spectral angle direction of the spectroscopic device. In this case, the intersection position is the diagonal line position at which the intensity of the focused secondary X-rays can be efficiently detected in many cases, and thus high-precision principal component analysis can be performed at a high counting rate with a simpler structure.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
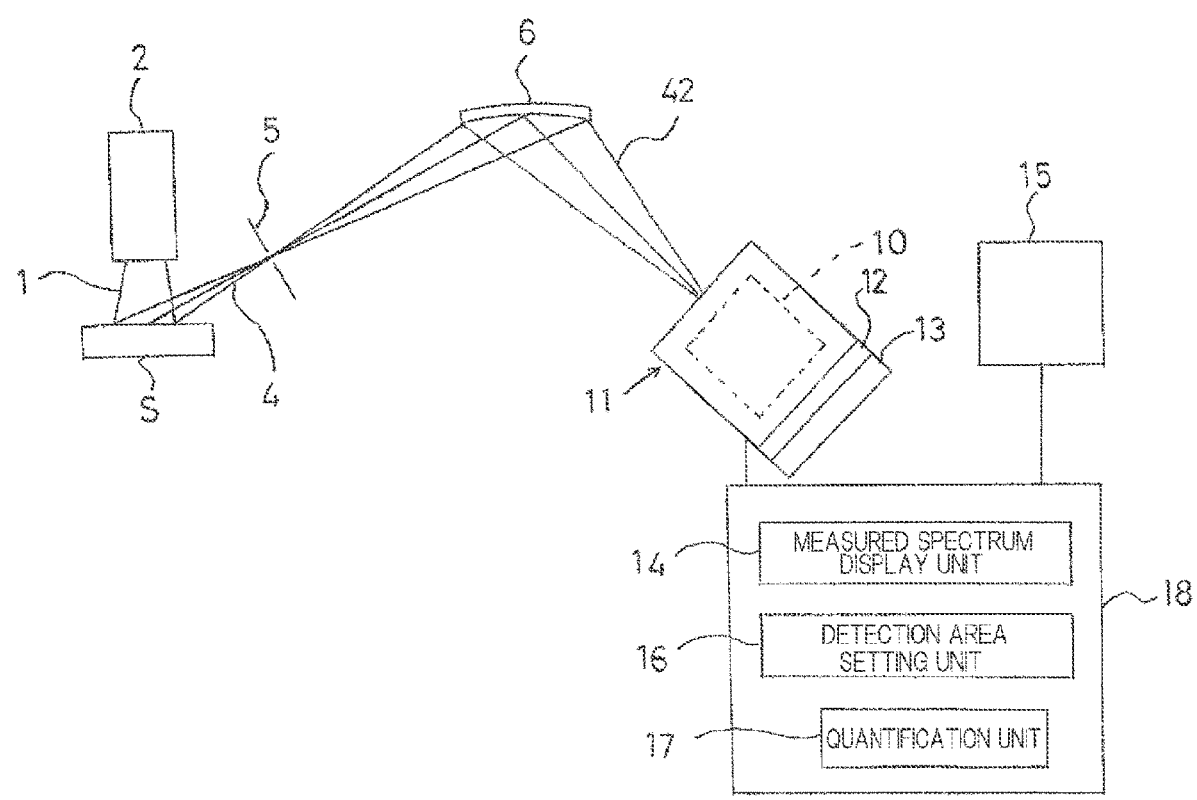
FIG. 1 is a schematic diagram illustrating a wavelength dispersive X-ray fluorescence spectrometer according to an embodiment of the present invention.

Hereinafter, a wavelength dispersive X-ray fluorescence spectrometer according to an embodiment of the present invention will be described with reference to the drawings. As shown in FIG. 1, the spectrometer is a wavelength dispersive X-ray fluorescence spectrometer of a focusing optical system, which includes: an X-ray source 2 that irradiates a sample S with primary X-rays 1; a divergence slit 5 that allows secondary X-rays 4 generated from the sample S to pass therethrough; a spectroscopic device 6 that monochromates and focuses the secondary X-rays 4 that have passed through the divergence slit 5; and a single one-dimensional detector 10 that has a plurality of detection elements 7 arranged linearly (see FIGS. 2 and 3) and has a receiving surface perpendicular to an optical axis of focused secondary X-rays 42 obtained by the secondary X-rays 4 being focused by the spectroscopic device 6. The wavelength dispersive X-ray fluorescence spectrometer includes a detector position change mechanism 11 that sets a position of the one-dimensional detector 10 such that the position of the one-dimensional detector 10 is freely changed to either a parallel position at which an arrangement direction of the detection elements 7 coincides with a spectral angle direction of the spectroscopic device 6, or an intersection position at which the arrangement direction of the detection elements 7 intersects the spectral angle direction of the spectroscopic device 6.

Figures 2, 3:
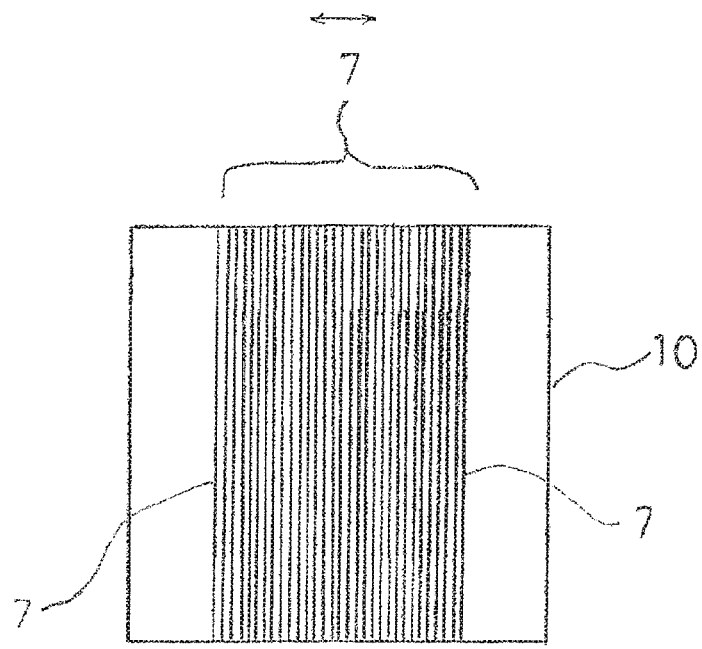
FIG. 2 is a diagram illustrating a receiving surface of a one-dimensional detector that is set at a parallel position.
FIG. 3 is a diagram illustrating the receiving surface of the one-dimensional detector that is set at an intersection position that is an orthogonal position.
Figure 9:
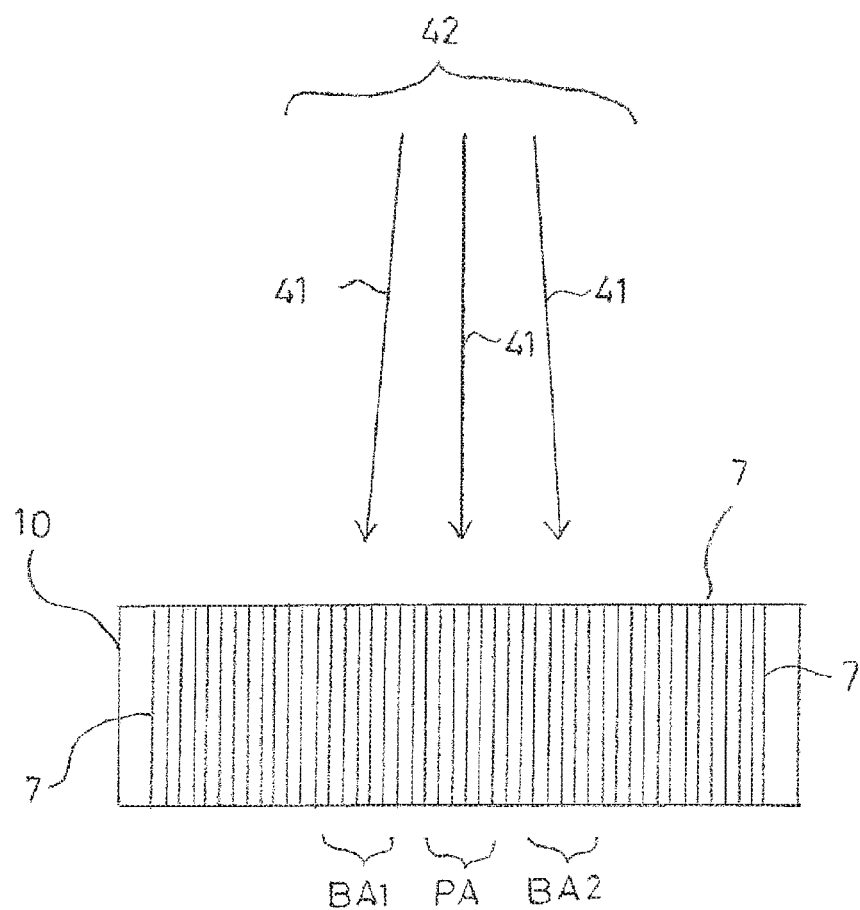
FIG. 9 is a diagram illustrating the detection elements in a peak area and background areas in the one-dimensional detector that is set at the parallel position.

In a state where the one-dimensional detector 10 is set at the parallel position, the receiving surface of the one-dimensional detector 10 is located at the focal point of the focused secondary X-rays 42 (a state shown in FIG. 1), and the arrangement direction of the detection elements 7 coincides with the spectral angle direction of the spectroscopic device 6 as shown in FIG. 2, as described above. For example, the first detection element 7 to the 256th detection element 7 are linearly arranged in order starting from a position at which the spectral angle is smallest (a left side position in FIG. 2, a diagonally upper side position in FIG. 1. In FIGS. 2 and 9, the receiving surface of the one-dimensional detector is viewed from the depth side of the drawing sheet in FIG. 1, and thus the right side and the left side are inverted from those in FIG. 1), at intervals of 75 μm.

Figure 4:
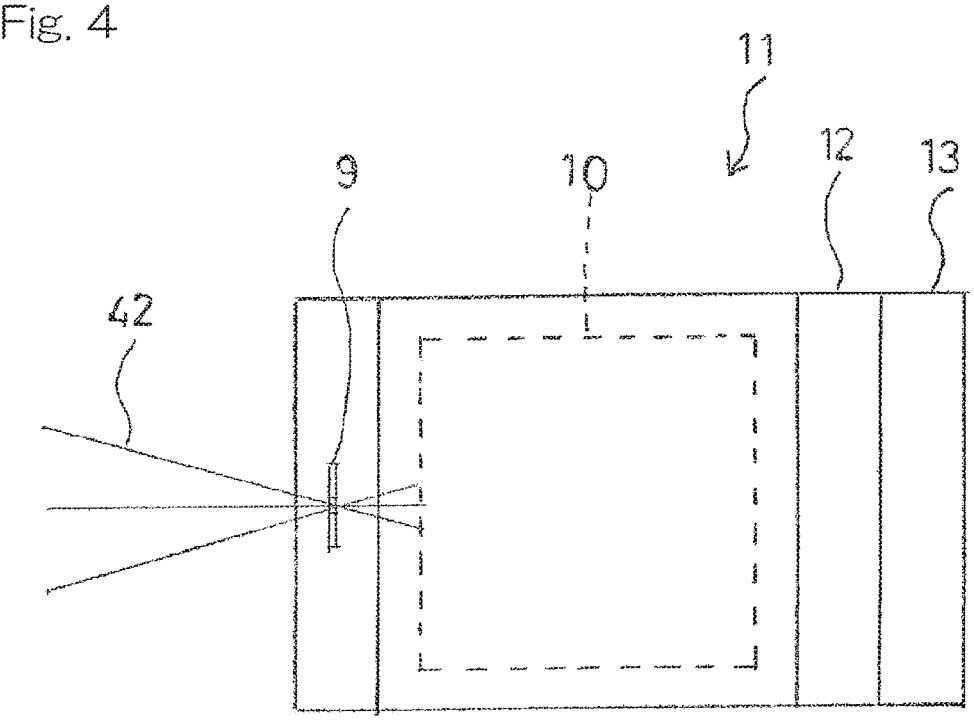
FIG. 4 is a diagram illustrating a receiving slit and the one-dimensional detector that is set at the intersection position.

In a state where the one-dimensional detector 10 is set at the intersection position, as shown in FIG. 4, a receiving slit 9 having an opening having a longitudinal direction orthogonal to the spectral angle direction of the spectroscopic device 6 is disposed at the focal point of the focused secondary X-rays 42, and the receiving surface of the one-dimensional detector 10 is located at the traveling direction side of the focused secondary X-rays 42 farther from the spectroscopic device 6 than the receiving slit 9 (in FIG. 4, a portion, in the detector position change mechanism 11, at which the receiving slit 9 is disposed is shown as a cutaway view). In addition, as described above, the arrangement direction of the detection elements 7 intersects the spectral angle direction of the spectroscopic device 6 as shown in FIG. 3.

The spectrometer in FIG. 1 further includes: a measured spectrum display unit 14 that displays a relationship between positions, in the arrangement direction, of the detection elements 7, and detected intensities by the detection elements 7, as a measured spectrum, on a display 15; a detection area setting unit 16 that allows an operator to set, in the arrangement direction of the detection elements 7, a peak area that is an area of the detection elements 7 corresponding to fluorescent X-rays to be measured, and a plurality of background areas that are areas of the detection elements 7 corresponding to background of the fluorescent X-rays to be measured; and a quantification unit 17 that calculates, as a net intensity $I_{net}$, an intensity of the fluorescent X-rays to be measured, based on a peak intensity obtained by integrating detected intensities by the detection elements 7 in the peak area, a background intensity obtained by integrating detected intensities by the detection elements 7 in each background area, and a background correction coefficient k which has been previously input, and that performs quantitative analysis, in a state where the one-dimensional detector 10 is set at the parallel position.

In a state where the one-dimensional detector 10 is set at the intersection position, the quantification unit 17 calculates an intensity of fluorescent X-rays to be measured, by integrating detected intensities by all the detection elements 7, and performs quantitative analysis. The measured spectrum display unit 14, the detection area setting unit 16, and the quantification unit 17 are included in a control unit 18 which is, for example, a computer and which controls the wavelength dispersive X-ray fluorescence spectrometer.

The detector position change mechanism 11 has, for example, a rotation mechanism 12 that rotates the one-dimensional detector 10 about the optical axis of the focused secondary X-rays 42 and is operated manually or driven by a motor, and a slide mechanism 13 that slides the one-dimensional detector 10 in the optical axis direction of the focused secondary X-rays 42 and is operated manually or driven by a motor. The one-dimensional detector 10 is set at either the parallel position or the intersection position by using the detector position change mechanism 11. The detector position change mechanism 11 is not limited to a mechanism having the rotation mechanism 12 and the slide mechanism 13, and may be, for example, a screw cramping structure in which screw holes for mounting the one-dimensional detector 10 to the wavelength dispersive X-ray fluorescence spectrometer are provided at positions corresponding to the parallel position and the intersection position, respectively.

Regarding the intersection position, in the present invention, a plurality of intersection positions having different intersection angles between the arrangement direction of the detection elements 7 and the spectral angle direction of the spectroscopic device 6 may be provided. However, in the spectrometer of the present embodiment, the intersection position is either one of an orthogonal position at which the arrangement direction of the detection elements 7 is orthogonal to the spectral angle direction of the spectroscopic device 6, or a single oblique intersection position at which the arrangement direction of the detection elements 7 obliquely intersects the spectral angle direction of the spectroscopic device 6 at a predetermined angle (intersects the spectral angle direction of the spectroscopic device 6 at an angle other than a right angle).

Here, at the intersection position, the intersection angle between the arrangement direction of the detection elements 7 and the spectral angle direction of the spectroscopic device 6 at the intersection position is preferably an angle at which the number of detection elements 7 on which the focused secondary X-rays 42 are incident is the largest and at which, of the projected area of the focused secondary X-rays 42 on a plane including (spreading so as to include) the receiving surface of the one-dimensional detector 10, the projected area of a portion protruding from the receiving surface of the one-dimensional detector 10 is the smallest.

Figure 5:
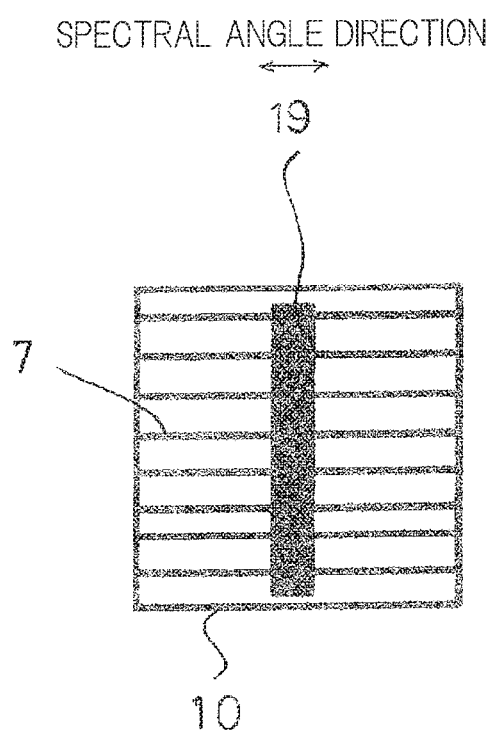
FIG. 5 is a diagram illustrating a projection image of focused secondary X-rays and arrangement of detection elements at the intersection position that is the orthogonal position.

For example, in a spectroscopic system for which the position of the one-dimensional detector 10 is to be set, when the length (the dimension in the longitudinal direction) of a projection image 19 of the focused secondary X-rays 42 on the plane including the receiving surface of the one-dimensional detector 10 is equal to or less than the length of the receiving surface in the arrangement direction of the detection elements 7, the intersection position is preferably the orthogonal position as shown in FIG. 5. In a state where the one-dimensional detector 10 is set at the orthogonal position, as shown in FIG. 3, the first detection element 7 to the 256th detection element 7 are arranged, in order starting from the lower side or the upper side in FIG. 3, in a direction orthogonal to the spectral angle direction of the spectroscopic device 6.

Figure 6:
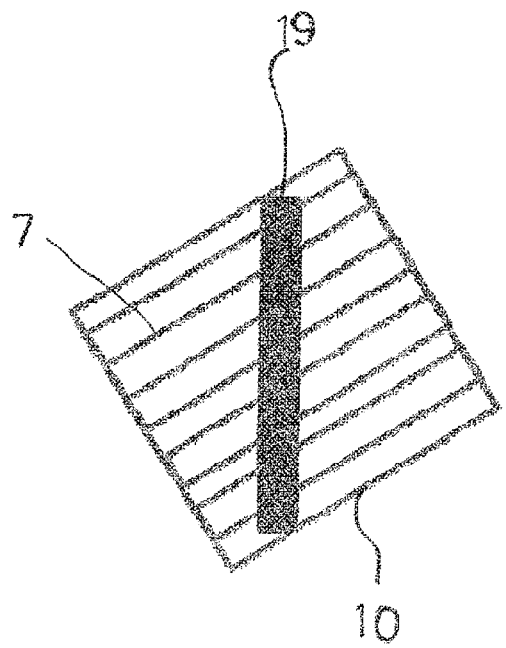
FIG. 6 is a diagram illustrating the projection image of the focused secondary X-rays and arrangement of the detection elements at the intersection position that is an oblique intersection position.
Figure 7:
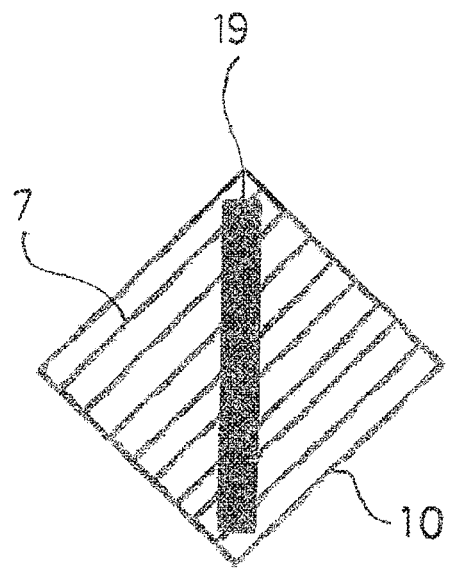
FIG. 7 is a diagram illustrating the projection image of the focused secondary X-rays and arrangement of the detection elements at the intersection position that is a diagonal line position and is the oblique intersection position.
Figure 8:
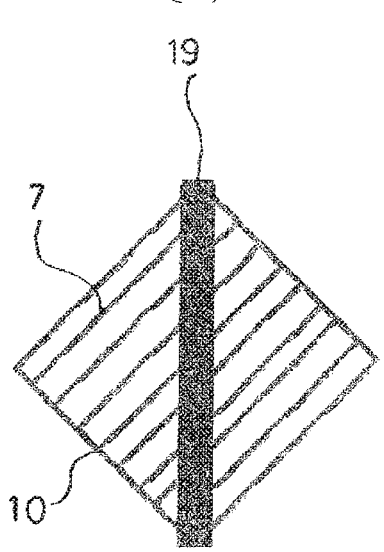
FIG. 8 is another diagram illustrating the projection image of the focused secondary X-rays and arrangement of the detection elements at the intersection position that is the diagonal line position and is the oblique intersection position.

For example, in the spectroscopic system for which the position of the one-dimensional detector 10 is to be set, when the length of the projection image 19 of the focused secondary X-rays 42 on the plane including the receiving surface of the one-dimensional detector 10 is longer than the length of the receiving surface in the arrangement direction of the detection elements 7, the intersection position is preferably the oblique intersection position as shown in FIGS. 6 to 8, and, preferably, the projection image 19 of the focused secondary X-rays 42 on the plane including the receiving surface of the one-dimensional detector 10 does not protrude from the receiving surface and is nearly in contact with the edge thereof as shown in FIGS. 6 and 7, or a protruding portion of the projection image 19 is made the smallest as shown in FIG. 8. For the sake of easy illustration and understanding, the detection elements 7 of which the number is made smaller than that in FIGS. 2 and 3 are shown in FIGS. 5 to 8.

As described above, when the intersection position is either one of the orthogonal position or the single oblique intersection position, the one-dimensional detector 10 can be set at an optimum position for the relationship with the projection image 19 of the focused secondary X-rays 42 on the receiving surface. Thus, the intensity of the focused secondary X-rays can be detected at the maximum, and high-precision principal component analysis can be performed at a higher counting rate.

In the case where the receiving surface of the one-dimensional detector 10 is rectangular, the intersection position may be a diagonal line position at which a diagonal line direction of the receiving surface of the one-dimensional detector 10 is orthogonal to the spectral angle direction of the spectroscopic device 6, instead of the intersection position being either one of the orthogonal position or the single oblique intersection position as described above. In this case, the intersection position is the diagonal line position at which the intensity of the focused secondary X-rays can be efficiently detected in many cases, and thus high-precision principal component analysis can be performed at a high counting rate with a simpler structure.

Next, operation of the spectrometer of the present embodiment in a state where the one-dimensional detector 10 is set at the parallel position will be described. When the one-dimensional detector 10 is set at the parallel position, the arrangement direction of the detection elements 7 coincides with the spectral angle direction of the spectroscopic device 6, and the first detection element 7 to the 256th detection element 7 are linearly arranged in order starting from a position at which the spectral angle is smallest (a left side position in FIG. 9), at intervals of 75 μm as shown in FIG. 9.

The spectrometer of the present embodiment includes the measured spectrum display unit 14, which is not an essential component in the present invention. When an operator sets a peak area and background areas, the measured spectrum display unit 14 is used together with the detection area setting unit 16. For example, the measured spectrum display unit 14 displays the measured spectrum shown in FIG. 10 on the display 15.

Figure 10:
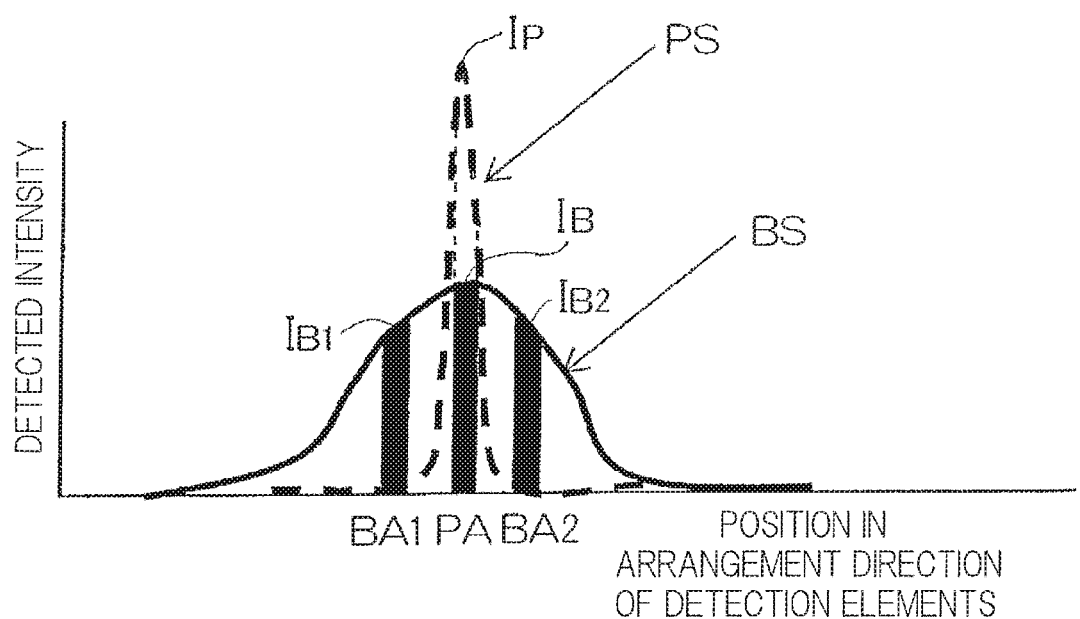
FIG. 10 is a diagram illustrating a peak area and background areas of a spectrum in which measured spectra of a blank sample and a sample that contains a large amount of element to be measured overlaid each other.

In FIG. 10, measured spectra of a sample S that contains a large amount of element to be measured, and a blank sample S are displayed so as to overlay each other. The intensity of the sample S that contains the large amount of element to be measured is indicated so as to be reduced, in order to facilitate comparison between the overlaying spectra. For this measured spectrum, the abscissa axis represents positions of the detection elements 7 in the arrangement direction thereof, and may represent the detection element numbers, spectral angles of the spectroscopic device 6, or energy values (the same applies to FIGS. 11 and 12). The ordinate axis represents detected intensities by the detection elements 7. The spectrum PS of fluorescent X-rays measured from the sample S that contains the large amount of element to be measured is represented by a broken line, and the background spectrum BS measured from the blank sample S is represented by a solid line. A peak area PA, a first background area $BA_1$, and a second background area $BA_2$ are displayed in the abscissa axis direction.

In FIG. 10, in each area $BA_1$, PA, $BA_2$, an area size of a portion that is less than or equal to each spectrum PS, BS (a portion between each spectrum PS, BS and the abscissa axis, three black bar-like portions in the spectrum BS, a portion obtained by further extending the central black bar-like portion with the broken line for the spectrum PS) corresponds to a detected intensity that is detected by the detection elements 7 in each area $BA_1$, PA, $BA_2$ for the sample S corresponding to the spectrum PS, BS. In FIG. 10, for the sample S that contains the large amount of element to be measured, a detected intensity $I_P$ detected by the detection elements 7 in the peak area PA can be read. For the blank sample S, a detected intensity $I_{B1}$ detected by the detection elements 7 in the first background area $BA_1$, a detected intensity $I_B$ detected by the detection elements 7 in the peak area PA, and a detected intensity $I_{B2}$ detected by the detection elements 7 in the second background area $BA_2$ can be read. Each spectrum PS, BS and each area $BA_1$, PA, $BA_2$ in the abscissa axis direction are displayed on the display 15 by the measured spectrum display unit 14, and a portion corresponding to each detected intensity described above is not necessarily displayed.

An operator performs setting based on the displayed measured spectra by using the detection area setting unit 16 such that, for example, the 123-rd to the 129-th detection elements 7 are set for measuring an intensity of fluorescent X-rays in the peak area PA, the 106-th to the 112-nd detection elements 7 are set for measuring background in the first background area $BA_1$, and the 140-th to the 146-th detection elements 7 are set for measuring background in the second background area $BA_2$. The setting of the detection elements 7 is stored in the detection area setting unit 16. Thus, the optimal peak area PA and the optimal background areas $BA_1$ and $BA_2$ can be set based on the displayed measured spectra. A peak area PA and background areas $BA_1$ and $BA_2$ may be set from the detection area setting unit 16, for example, based on measured spectra measured by another wavelength dispersive X-ray fluorescence spectrometer of the same type, without using the measured spectrum display unit 14.

When the peak area PA, the first background area $BA_1$, and the second background area $BA_2$ are set in the detection area setting unit 16, the intensity of the secondary X-rays 41 (the center in FIG. 9) in which a spectral angle is an angle θ, is detected by the detection elements 7 in the peak area PA, the intensity of the secondary X-rays 41 (the left side in FIG. 9) in which a spectral angle is less than the spectral angle θ, is detected by the detection elements 7 in the first background area $BA_1$, and the intensity of the secondary X-rays 41 (the right side in FIG. 9) in which the spectral angle is greater than the spectral angle θ is detected by the detection elements 7 in the second background area $BA_2$. In FIG. 9, three lines, of the focused secondary X-rays 42, which are different from each other in spectral angle as described above, are represented as the secondary X-rays 41 on the optical axes thereof.

When an analytical sample S has been measured, the quantification unit 17 appropriately subtracts the background intensity $I_B$ in the peak area from the peak intensity $I_P$ and calculates a net intensity $I_{net}$ of the fluorescent X-rays to be measured, based on equation (1) and equation (2) described below, to perform quantitative analysis.

$$I_{net} = I_P - I_B \quad (1)$$

$$I_B = k(I_{B1} + I_{B2}) \quad (2)$$

$I_{net}$: calculated net intensity of fluorescent X-rays to be measured $I_P$: peak intensity obtained by integrating detected intensities by detection elements (the 123-rd to the 129-th detection elements) in peak area $I_B$: background intensity in peak area $I_{B1}$: background intensity obtained by integrating detected intensities by detection elements (the 106-th to the 112-nd detection elements) in first background area $I_{B2}$: background intensity obtained by integrating detected intensities by detection elements (the 140-th to the 146-th detection elements) in second background area k: background correction coefficient The background correction coefficient k is previously obtained based on the following equation (3) by measuring the blank sample S and is input into the quantification unit 17.

$$k = I_B^B / (I_{B1}^B + I_{B2}^B) \quad (3)$$

$I_B^B$: peak intensity, of blank sample, obtained by integrating detected intensities by detection elements (the 123-rd to the 129-th detection elements) in peak area $I_{B1}^B$: background intensity, of blank sample, obtained by integrating detected intensities by detection elements (the 106-th to the 112-th detection elements) in first background area $I_{B2}^B$: background intensity, of blank sample, obtained by integrating detected intensities by detection elements (the 140-th to the 146-th detection elements) in second background area The background correction coefficient k may be calculated simultaneously when calibration curve constants are obtained by regression calculation, by using a calibration curve equation of the following equation (4).

$$W = A(I_P - k(I_{B1} + I_{B2})) + B \quad (4)$$

W: content of element, to be measured, in sample

A, B: calibration curve constants

As described above, in the spectrometer of the present embodiment, in a state where the one-dimensional detector 10 is set at the parallel position, background which is measured so as to indicate an intensity lower than a background intensity that actually occurs is accurately corrected, and the peak intensity $I_P$ and the background intensities $I_{B1}$ and $I_{B2}$ are simultaneously measured. Thus, high-precision quantitative analysis in which an accurate net intensity $I_{net}$ is obtained at a high speed can be performed.

In the example described above, measurement is performed in the two background areas BA1 and BA2, to correct (remove) background. However, the measurement may be performed in one or three or more background areas BA. In the example described above, the number of the detection elements 7 is set such that the number of the detection elements 7 in the peak area PA, the number of the detection elements 7 in the first background area BA1, and the number of the detection elements 7 in the second background area BA2 are the same. However, the numbers may be different.

Figure 11:
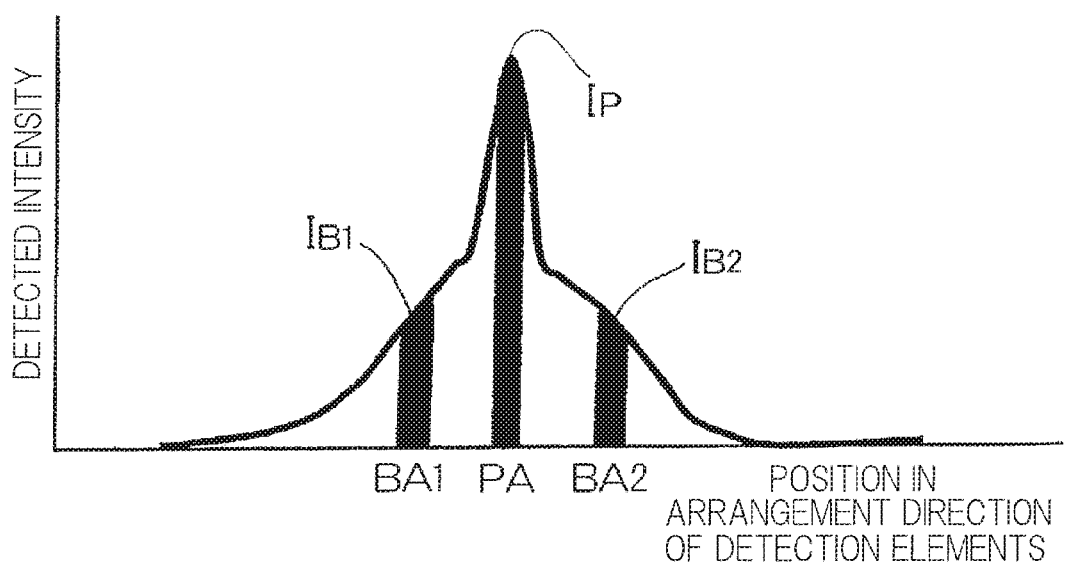
FIG. 11 is a diagram illustrating a peak measurement area and background measurement areas of a measured spectrum of one sample.
Figure 12:
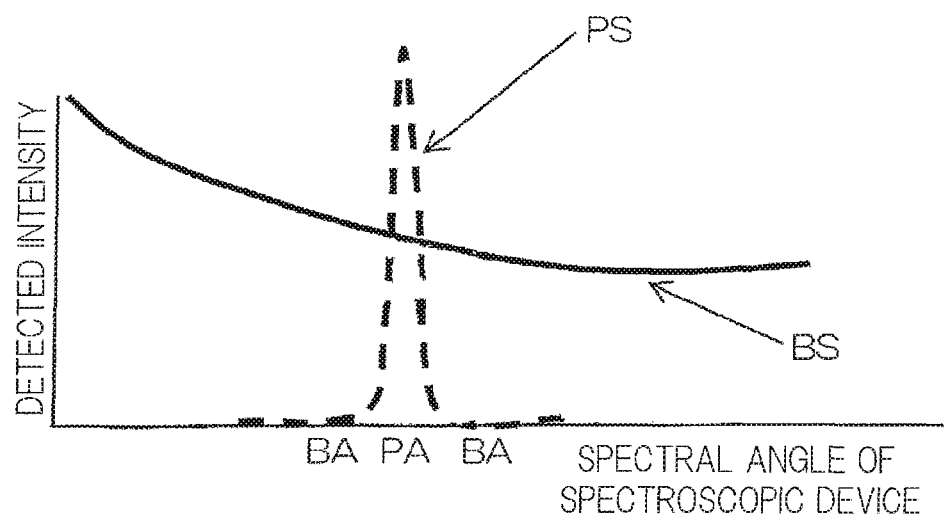
FIG. 12 schematically illustrates a spectrum of fluorescent X-rays and a background spectrum.

Instead of the above-described measured spectrum in which the measured spectra of the blank sample S and the sample S that contains the large amount of element to be measured overlaid each other, a measured spectrum shown in FIG. 11, of one sample S, from which a spectrum of fluorescent X-rays to be measured and a background spectrum can be observed may be used. In FIG. 11, for the one sample S, the detected intensity $I_{B1}$ detected by the detection elements 7 in the first background area $BA_1$, the detected intensity $I_P$ detected by the detection elements 7 in the peak area PA, and the detected intensity $I_{B2}$ detected by the detection elements 7 in the second background area $BA_2$, can be read.

Next, operation of the spectrometer of the present embodiment in a state where the one-dimensional detector 10 is set at the intersection position will be described. When the one-dimensional detector 10 is set at the intersection position, the arrangement direction of the detection elements 7 intersects the spectral angle direction of the spectroscopic device 6. The quantification unit 17 calculates an intensity of fluorescent X-rays to be measured, by integrating detected intensities by all the detection elements 7, and performs quantitative analysis. The maximum counting rate of one detection element 7 is, for example, 1 Mcps. Thus, when a one-dimensional detector 10 having 256 detection elements 7 is used, measurement can be performed at a counting rate up to 256 Mcps. An actually measured intensity is at most about 20 Mcps, and thus there is a margin that is greater than ten times of 20 Mcps.

As described above, in the spectrometer of the present embodiment, in a state where the one-dimensional detector 10 is set at the intersection position, an intensity of fluorescent X-rays to be measured is calculated by integrating detected intensities by all the detection elements 7, whereby high-precision principal component analysis can be performed at a high counting rate.

As described above, the wavelength dispersive X-ray fluorescence spectrometer of the present embodiment includes: the detector position change mechanism 11 for setting the position of the one-dimensional detector 10 such that the position of the one-dimensional detector 10 is freely changed to either the parallel position at which the arrangement direction of the detection elements 7 coincides with the spectral angle direction of the spectroscopic device 6 or the intersection position at which the arrangement direction of the detection elements 7 intersects the spectral angle direction of the spectroscopic device 6, and thus can quickly perform, with a simple structure, both high-precision quantitative analysis in which an accurate net intensity $I_{net}$ is obtained at a high speed and high-precision principal component analysis at a high counting rate.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . primary X-rays
2 . . . X-ray source
4 . . . secondary X-rays
5 . . . divergence slit
6 . . . spectroscopic device
7 . . . detection element
9 . . . receiving slit
10 . . . one-dimensional detector
11 . . . detector position change mechanism
16 . . . detection area setting unit
17 . . . quantification unit
42 . . . focused secondary X-rays
$BA_1$, $BA_2$ . . . background area
PA . . . peak area
S . . . sample

What is claimed is:

1. A wavelength dispersive X-ray fluorescence spectrometer of a focusing optical system, the wavelength dispersive X-ray fluorescence spectrometer comprising:
    an X-ray source configured to irradiate a sample with primary X-rays;
    a divergence slit configured to allow secondary X-rays generated from the sample to pass therethrough;
    a spectroscopic device configured to monochromate and focus the secondary X-rays that have passed through the divergence slit; and
    a single one-dimensional detector having a plurality of detection elements arranged linearly and having a receiving surface perpendicular to an optical axis of focused secondary X-rays obtained by the secondary X-rays being focused by the spectroscopic device, wherein
    the wavelength dispersive X-ray fluorescence spectrometer comprises a detector position change mechanism for setting a position of the one-dimensional detector such that the position of the one-dimensional detector is freely changed to either a parallel position at which an arrangement direction of the detection elements coincides with a spectral angle direction of the spectroscopic device or an intersection position at which the arrangement direction of the detection elements intersects the spectral angle direction of the spectroscopic device,
    in a state where the one-dimensional detector is set at the parallel position, the receiving surface of the one-dimensional detector is located at a focal point of the focused secondary X-rays, and
    in a state where the one-dimensional detector is set at the intersection position, a receiving slit having an opening having a longitudinal direction orthogonal to the spectral angle direction of the spectroscopic device is disposed at the focal point of the focused secondary X-rays, and the receiving surface of the one-dimensional detector is located at a traveling direction side of the focused secondary X-rays farther from the spectroscopic device than the receiving slit.

2. The wavelength dispersive X-ray fluorescence spectrometer as claimed in claim 1, further comprising:
    a detection area setting unit configured to allow for setting a peak area that is an area of the detection elements corresponding to fluorescent X-rays to be measured, and a plurality of background areas that are areas of the detection elements corresponding to background of the fluorescent X-rays to be measured, in the arrangement direction of the detection elements; and
    a quantification unit configured to calculate, as a net intensity, an intensity of the fluorescent X-rays to be measured, based on a peak intensity obtained by integrating detected intensities by the detection elements in the peak area, a background intensity obtained by integrating detected intensities by the detection elements in each background area, and a background correction coefficient which is previously input, and to perform quantitative analysis, in a state where the one-dimensional detector is set at the parallel position.

3. The wavelength dispersive X-ray fluorescence spectrometer as claimed in claim 1, further comprising a quantification unit configured to calculate an intensity of fluorescent X-rays to be measured, by integrating detected intensities by all the detection elements, and to perform quantitative analysis, in a state where the one-dimensional detector is set at the intersection position.

4. The wavelength dispersive X-ray fluorescence spectrometer as claimed in claim 1, wherein the intersection position is either one of an orthogonal position at which the arrangement direction of the detection elements is orthogonal to the spectral angle direction of the spectroscopic device or a single oblique intersection position at which the arrangement direction of the detection elements obliquely intersects the spectral angle direction of the spectroscopic device at a predetermined angle.

5. The wavelength dispersive X-ray fluorescence spectrometer as claimed in claim 1, wherein
   the receiving surface of the one-dimensional detector is rectangular, and
   the intersection position is a diagonal line position at which a diagonal line direction of the receiving surface of the one-dimensional detector is orthogonal to the spectral angle direction of the spectroscopic device.

\* \* \* \* \*